US008775929B2

(12) United States Patent  (10) Patent No.: US 8,775,929 B2
Kawamoto  (45) Date of Patent: Jul. 8, 2014

(54) INFORMATION PROCESSING APPARATUS COMPUTER READABLE MEDIUM, AND INFORMATION PROCESSING METHOD FOR MAINTAINING CONSISTENCY BETWEEN STORED TARGET DOCUMENT INFORMATION AND A FORMED IMAGE

(75) Inventor: Shinji Kawamoto, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 1587 days.

(21) Appl. No.: 11/777,369

(22) Filed: Jul. 13, 2007

(65) Prior Publication Data

US 2008/0134026 A1 Jun. 5, 2008

(30) Foreign Application Priority Data

Nov. 30, 2006 (JP) .................................. 2006-323743

(51) Int. Cl.
*G06F 17/00* (2006.01)
(52) U.S. Cl.
USPC ......................................... 715/255; 715/229
(58) Field of Classification Search
CPC .......... G06F 17/2205; G06F 17/30011; G06F 3/1222; G06F 17/24; G06F 17/2211; G06F 17/2247; G06F 17/277
USPC ......... 715/200, 229, 233, 255, 271, 272, 273, 715/274, 276
See application file for complete search history.

(56) References Cited

U.S. PATENT DOCUMENTS

| | | | | |
|---|---|---|---|---|
| 2003/0121006 | A1* | 6/2003 | Tabata et al. | 715/513 |
| 2004/0252322 | A1* | 12/2004 | Gassho et al. | 358/1.14 |
| 2004/0264811 | A1* | 12/2004 | Yano et al. | 382/306 |
| 2005/0171914 | A1* | 8/2005 | Saitoh | 705/51 |
| 2005/0246620 | A1* | 11/2005 | Ebata | 715/500 |

FOREIGN PATENT DOCUMENTS

| | | |
|---|---|---|
| CN | 1577324 A | 2/2005 |
| JP | 2004-133910 A | 4/2004 |
| JP | 2004-265140 A | 9/2004 |
| JP | 2005-049982 A | 2/2005 |
| JP | 2005-293003 A | 10/2005 |

OTHER PUBLICATIONS

Chinese Office Action dated Mar. 27, 2009.
Japanese Office Action issued in corresponding Japanese application No. 2006-323743 on Apr. 18, 2011.

* cited by examiner

*Primary Examiner* — Cesar Paula
*Assistant Examiner* — Howard Cortes
(74) *Attorney, Agent, or Firm* — Sughrue Mion, PLLC

(57) ABSTRACT

An information processing apparatus includes: a storage that stores document information; an image formation processor that receives an instruction to form an image corresponding to target document information selected from the document information stored in the storage, and that performs an image formation processing with respect to the target document information; a recording unit that records first information, which indicates that the image formation processing is performed, and associates the first information with the target document information; and a controller that controls, in a case where a request for processing with respect to the document information associated with the first information is received, to restrict the requested processing.

14 Claims, 10 Drawing Sheets

FIG. 2

| DOCUMENT IDENTIFIER | REFERENCE INFORMATION | ATTRIBUTE INFORMATION |
|---|---|---|
| aaaa | bbbb | cccc, dddd ⋯ |
| eeee | ffff | ⋯ |
| gggg | hhhh | ⋯ |
| ⋮ | ⋮ | ⋮ |

FIG. 7

| SER NAME | REPLACEMENT PART SPECIFYING INFORMATION |
|---|---|
| pppp | (x1, y1) — (x2, y2) |
| qqqq | (x3, y3) — (x4, y4) |
| ⋮ | ⋮ |

DOCUMENT IDENTIFIER : aaaa

FIG. 8

REQUEST FOR MANAGERIAL DECISION

XXXXXX

| APPROVAL | | | |
|---|---|---|---|
| | GENERAL MANAGER | MANAGER | CHIEF CLERK |

INFORMATION PROCESSING APPARATUS COMPUTER READABLE MEDIUM, AND INFORMATION PROCESSING METHOD FOR MAINTAINING CONSISTENCY BETWEEN STORED TARGET DOCUMENT INFORMATION AND A FORMED IMAGE

CROSS-REFERENCE TO RELATED APPLICATIONS

This application is based on and claims priority under 35 U.S.C. 119 from Japanese Patent Application No. 2006-323743 filed Nov. 30, 2006.

BACKGROUND

1. Technical Field

The present invention relates to an information processing apparatus, to a computer readable medium, to computer data signal, and to an information processing method.

2. Related Art

In recent years, a system has been developed, which computer-readable identification information is added to electronically managed document information when the document information is printed, and which enables the coexistence of an electronic document and a document recorded on a paper medium in a review process and an approval process of a workflow.

SUMMARY

According to an aspect of the present invention, an information processing apparatus including: a storage that stores document information; an image formation processor that receives an instruction to form an image corresponding to target document information selected from the document information stored in the storage, and that performs an image formation processing with respect to the target document information; a recording unit that records first information, which indicates that the image formation processing is performed, and associates the first information with the target document information; and a controller that controls, in a case where a request for processing with respect to the document information associated with the first information is received, to restrict the requested processing.

BRIEF DESCRIPTION OF THE DRAWINGS

Exemplary embodiment of the present invention will be described in detail based on the following figures, wherein:

FIG. 2 is an explanatory view illustrating an example of a database held by the information processing apparatus according to the embodiment of the invention;

FIG. 7 is an explanatory view illustrating an example of holding the replacement part specifying information in the information processing apparatus according to the embodiment of the invention;

FIG. 8 is an explanatory view illustrating another outline of replacement part specifying information in the information processing apparatus according to the embodiment of the invention;

DETAILED DESCRIPTION

Figure 1:
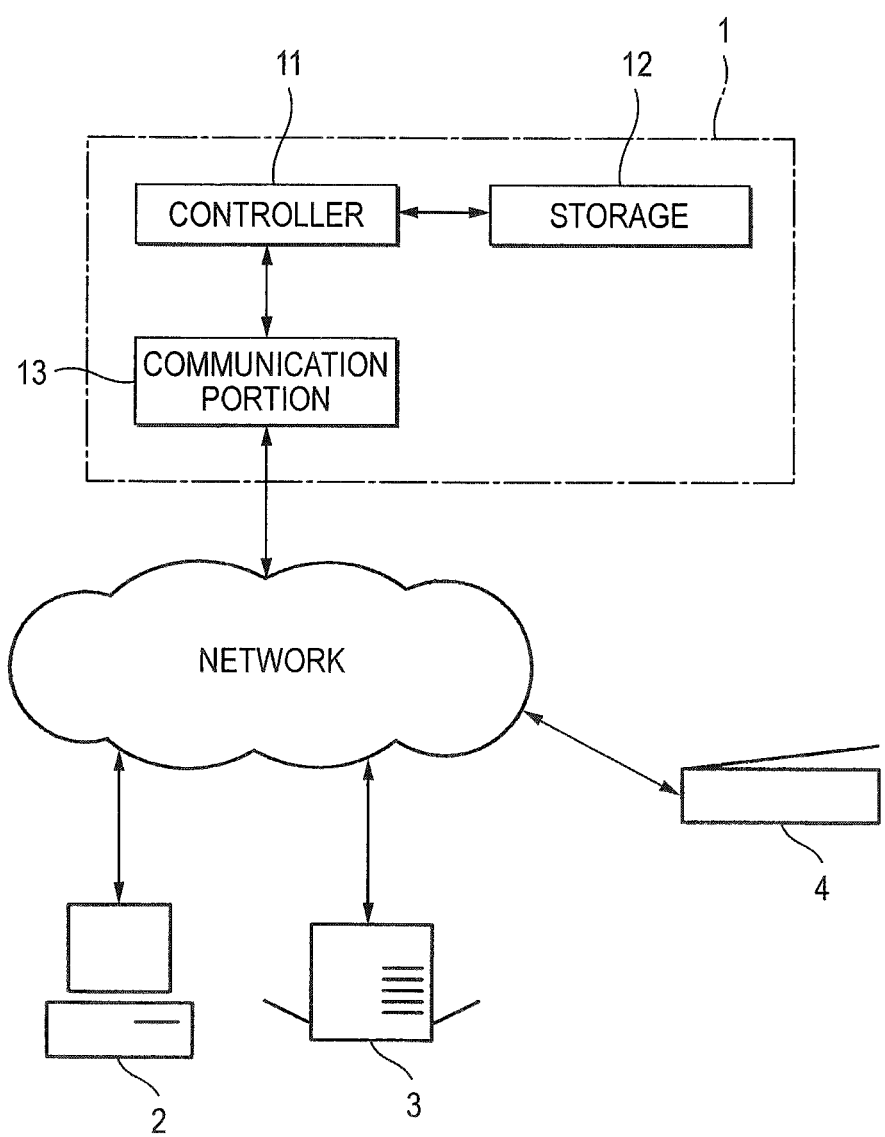
FIG. 1 is a block view illustrating the configuration of an information processing apparatus according to an embodiment of the invention and an example of the connection between the information processing apparatus and each external apparatus.

An embodiment of the invention is described below with reference to the accompanying drawings. As illustrated in FIG. 1, an information processing apparatus 1 includes a control portion 11, a storage portion 12, and a communication portion 13. Additionally, the information processing apparatus 1 is connected to a client apparatus 2, an image forming apparatus 3, and an image reading apparatus 4.

The control portion 11 is a program control device, such as a CPU, and operates according to a program stored in the storage portion 12. The control portion 11 according to the present embodiment performs processing according to document information (e.g., delivery, registration, and update) to be accessed, in response to an access request for the document information stored in the storage portion 12. For example, the control portion 11 transmits the document information to a source of the request. Also, when receiving an instruction to form an image, the control portion 11 outputs the document information, an image corresponding to which is to be formed, to the image forming apparatus 3 and causes the image forming apparatus 3 to print the document information. Additionally, the control portion 11 performs a process of restricting an access to the document information, an image corresponding to which is to be formed. Details of this process will be described later.

The storage portion 12 includes a memory element, such as a RAM (Random Access Memory), and a storage device, such as a hard disk. The storage portion 12 holds a program executed by the control portion 12. The storage portion 12 operates also as a work memory for the control portion 11. Incidentally, the program stored in the storage portion 12 may be provided by being stored in a recording medium, such as a CD-ROM or a DVD-ROM. According to the present embodiment, the substance of the document information (i.e., substance information) is stored in the storage portion 12.

Incidentally, the document information may be, for example, bit-mapped image information. Alternatively, the document information may include various image elements, such as a character string, a line drawing, a bit-map, like a PDF (Portable Document Format).

The communication portion 13 is a communication means, for example, a network interface, and is connected to the client apparatus 2, the image forming apparatus 3, and the image reading apparatus 4 through communication circuits. The communication portion 13 sends designated information to a designated destination according to the instruction input from the control portion 11. Additionally, the communication portion 13 outputs information received from the client apparatus 2, the image forming apparatus 3, and the image reading apparatus 4 to the control portion 11.

The client apparatus 2 is implemented by a personal computer or the like. The client apparatus 2 transmits requests for delivery, registration, and update of specified information and for formation of an image corresponding to the specified document information together with information, which specifies the document information, according to an instruction from a user. For example, the client apparatus 2 receives from a user a request for update of document information. Then, the client apparatus 2 requests the information processing apparatus 1 to distribute document information to be updated. The client apparatus 2 displays the document information distributed from the information processing apparatus 1 and receives alterations made on the contents of the document information from a user. The client apparatus 2 receives an instruction to register the altered document information and requests the information processing apparatus 1 to register the altered document information by replacing the document information, which is registered just before the alteration, with the altered document information.

The image forming apparatus 3 is a printer and forms an image on a medium, such as a sheet of paper, according to document information in accordance with the instruction input from the information processing apparatus 1. The image reading apparatus 4 is a scanner and optically reads an image formed on the medium to be read. Then, the image reading apparatus 4 outputs information, which represents the read image, as image information to the image processing apparatus 1.

(Image Formation Processing Time)

Next, the contents of processing performed by the control portion 11 are described below. The control portion 11 basically performs processing on document information stored in the storage portion 12 according to a request received from the client apparatus 2. It is assumed that plural pieces of document information are stored in the storage portion 12, and that peculiar identifiers (i.e., document identifiers) are assigned to the plural pieces of document information, respectively. As illustrated in FIG. 2, a database holding document identifiers, information (i.e., reference information) representing each location at which the substance of document information identified by the document identifier is stored, and attribute information are stored in the storage portion 12 as a specific example, by being associated with one another. FIG. 2 is an explanatory view illustrating an example of document information database stored in the storage portion 12.

Incidentally, the attribute information may include information representing a time and date at which document information is registered, information specifying a registered user, information representing the title of document information, and information indicating the number of pages of the contents represented by the document information.

Figure 3:
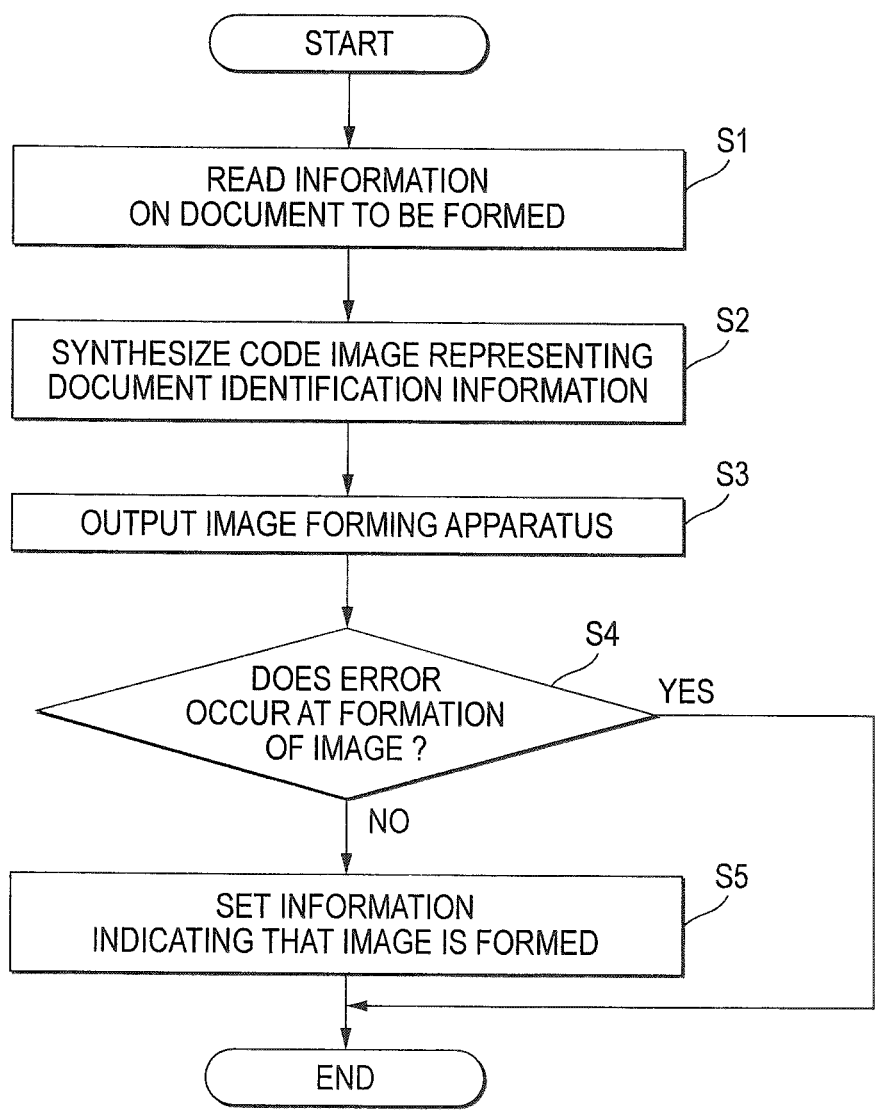
FIG. 3 is a flowchart illustrating an example of a process to be performed by the information processing apparatus according to the embodiment of the invention at the formation of an image.

When receiving information (e.g., a document identifier) specifying document information and an instruction (i.e., an image formation instruction) to form an image corresponding to the specified document information from the client apparatus 2, the control portion 11 starts performing a process illustrated in FIG. 3. When receiving this image formation instruction, the control portion 11 reads from the storage portion 12 substantive information representing target document information, an image corresponding to which is to be formed, in step S1. Then, the control portion 11 combines a computer-readable code image (e.g., a barcode) representing a document identifier with an image representing the read substantive information in step S2. Subsequently, the control portion 11 outputs information representing a resultant image to the image forming apparatus 3 in step S3.

Consequently, an image representing the substantive information and the code indicating the document identifier is formed on a medium, such as a sheet of paper, in the image forming apparatus 3.

In step S4, the control portion 11 makes an inquiry to the image forming apparatus 3 about whether the formation of an image corresponding to the document information is completed. Thus, the control portion 11 checks whether an error occurs in the formation of the image. If it is determined in step S4 that an error occurs, this process is finished.

Conversely, if it is determined in step S4 that no error occurs, the control portion sets information, which indicates that the image formation is performed (i.e., information indicating that an access should be restricted), as attribute information associated with the target document information in the database stored in the storage portion 12 in step S5. Then, the process is finished.

(Browsing/Updating Process)

Figure 4:
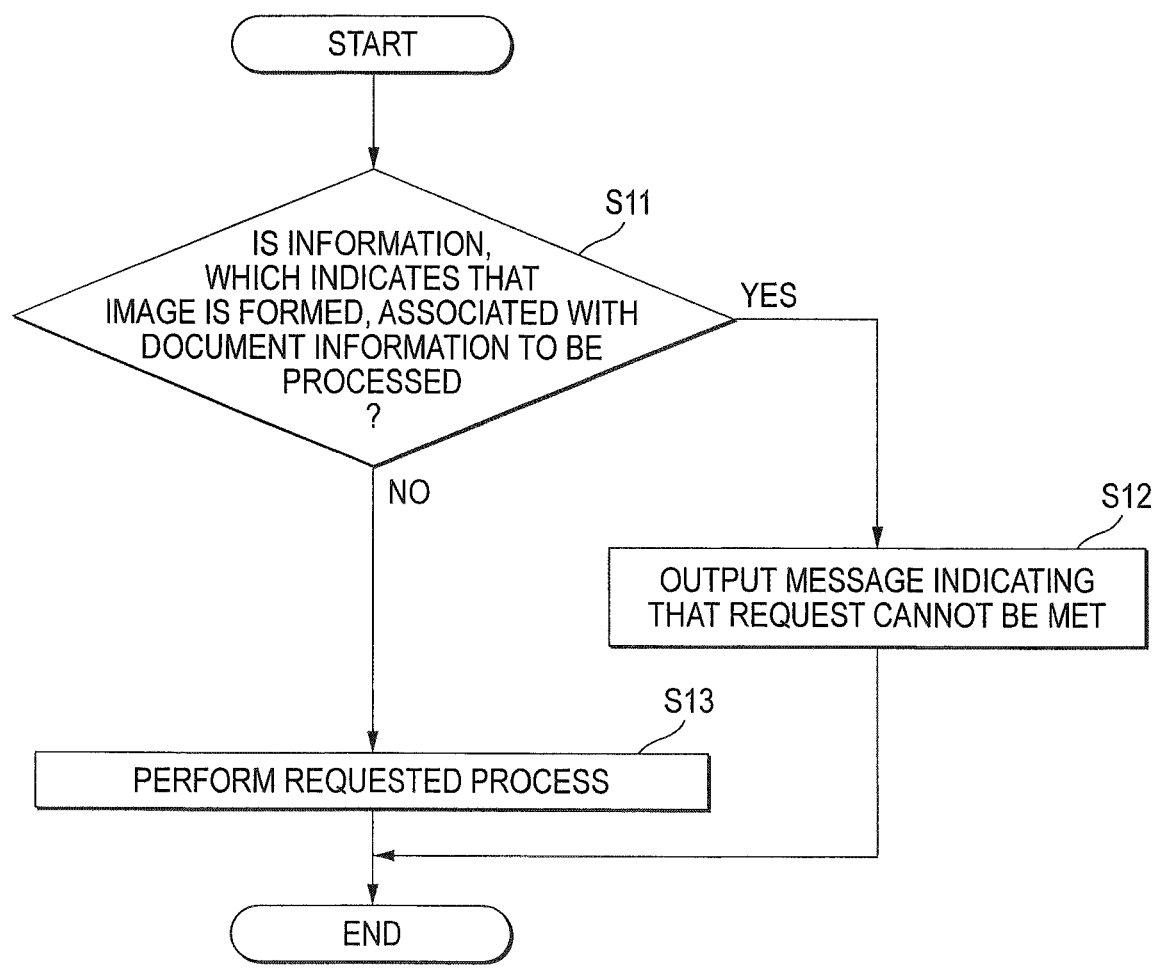
FIG. 4 is a flowchart illustrating an example of a process of responding to a request for document information, which is performed by the information processing apparatus according to the embodiment of the invention.

The control portion 11 provides document information, which is stored in the storage portion 12, to the client apparatus 2. Also, the control portion 11 performs a process of updating document information according to a request received from the client apparatus 2. More specifically, this process is performed when receiving a request for document information. That is, as illustrated in FIG. 4, the control portion 11 reads a document identifier (i.e., information specifying document information to be processed) included in the request. Then, in step S11, the control portion 11 refers to attribute information associated with the document identifier and checks whether the attribute information includes information indicating that the image formation is performed.

If it is determined in step S11 that the attribute information includes the information indicating that the image formation is performed, the control portion 11 transmits to the client apparatus 2, which has made the request, for example, a message, which indicates that the document information is inaccessible, in step S12. Then, the process is terminated. Consequently, the control portion 11 restricts the document information, which is obtained after the image formation is performed, from being browsed and updated.

Conversely, if it is determined in step S11 that the attribute information does not include the information indicating that the image formation is performed, the control portion 11 reads the substantive information representing the document information identified by the read document identifier in step S13. For example, in the case of a request for browsing, the control portion 11 sends the document information to the client apparatus 2. In the case of a request for updating, the control portion 11 causes the updated document information received together with the document identifier to be stored at a storage location represented by reference information, which is recorded in the database by being associated with the document identifier. Also, the control portion 11 overwrites the updated document information on the document information which has been stored before updated.

Thus, according to the present embodiment, an access to electronic information corresponding to document information output to a paper medium is restricted. Superficially, the electronic information appears to be deleted. Consequently, the consistency of document information between the electronic information and the document information output to the paper medium is maintained.

(Capture)

When the control portion 11 of the information processing apparatus 1 according to the present embodiment receives image information captured by optically reading the medium on which an image corresponding to the document information is formed, the control portion 11 performs a process (i.e., a replacement storage process) of replacing original document information with the image information and storing the received image information in the storage portion 12. Hereinafter, this replacement storage process is described.

Figure 5:
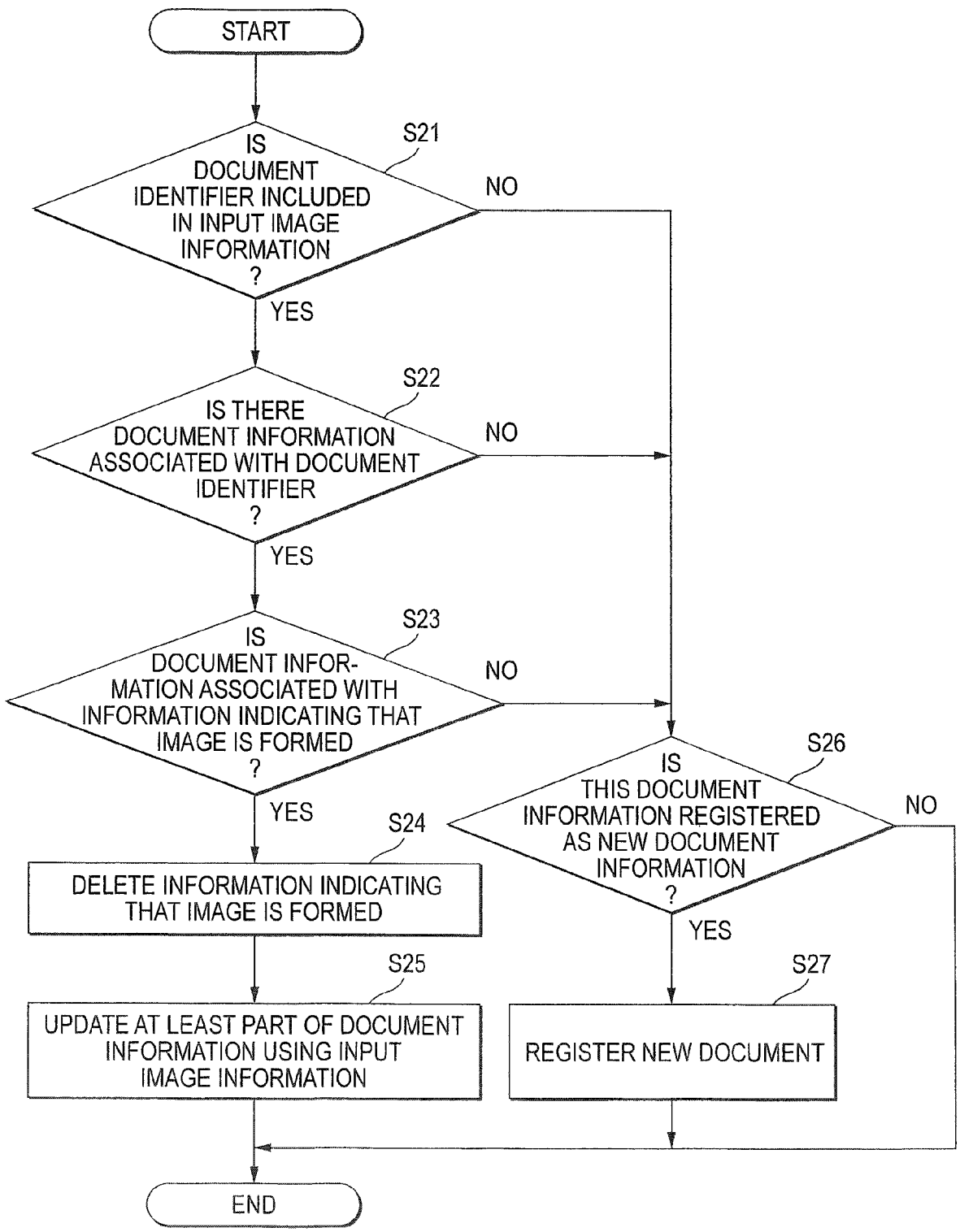
FIG. 5 is a flowchart illustrating an example of a process of replacing document information, which is performed by the information processing apparatus according to the embodiment of the invention.

When the image information is input to the control portion 11 from the image reading apparatus 4, the control portion 11 starts performing a process illustrated in FIG. 5. The control portion 11 first checks in step S21 whether the input image information includes a document identifier as a computer-readable code image. This processing is a widespread technique of reading information from a barcode or the like. Thus, the detailed description of this technique is omitted herein.

If the document identifier is included, the control portion 11 checks in step S22 whether the document information associated with the document identifier is stored in the storage portion 12. If it is determined that the document information associated with the document identifier is stored in the storage portion 12, the control portion 11 refers to the attribute information associated with the document identifier and checks in step S23 whether the image formation has been performed. If the attribute information, to which the control portion 11 refers, includes the information indicating that the image formation has been performed, the control portion 11 deletes the information, which indicates that the image formation has been performed, in step S24. Also, the control portion 11 replaces at least a part of the document information identified by the document identifier read in step S21 with the input image information in step S25. Then, the process is finished. The control portion 11 changes the information, which indicates that the image formation has been performed, to the information, which does not indicate that the image formation has been performed, by deleting the information, which indicates that the image formation has been performed, from the attribute information associated with the document identifier in step S24. However, another process, such as an overwriting process or a correction process, can be employed, as long as such a process changes the information, which indicates that the image formation has been performed, to the information not indicating that the image formation has been performed.

Incidentally, if it is determined in step S23 that the attribute information, to which the control portion 11 refers, does not include the information indicating that the image formation has been performed, the control portion 11 determines in step S26 whether this document information is to be registered as new document information. In an operating portion, for example, a touch panel (not shown), the control portion 11 makes an inquiry to a user about whether the document information is registered as new document information. It is sufficient for the control portion 11 to determine according to a response thereto from the user whether the document information is to be registered as new document information.

If it is determined in step S26 that the information is not to be registered as new document information, the control portion 11 finishes the process. Conversely, if it is determined in step S26 that the information is to be registered as new document information, the control portion 11 issues a new document identifier. Then, in step S27, the control portion 11 causes the storage portion 12 to store the input image information as new document information. Also, the control portion 11 records the newly issued document identifier (i.e., registers a new document) in the database by associating the reference information representing a storage location, at which the input image information is stored, with the newly issued document identifier. Then, the control portion 11 finishes the process.

If it is determined in step S22 that the document information associated with the document identifier read from the image information is not stored in the storage portion 12, the control portion 11 advances to step S26, in which it is determined whether this image information is to be registered as new document information. In this case, when a document identifier is issued in the process of registering a new document, the read document identifier may be used as a new document identifier.

Further, in a case where it is determined in step S21 that the document identifier is not included in the input image information, it is sufficient that the control portion 11 advances to step S26 and continues to perform the process.

Incidentally, in these cases, the control portion 11 may advance directly to step S27, in which the image information is registered as new document information, instead of proceeding to step S26. Alternatively, the control portion 11 may finish the process, without performing processing in steps S26 and S27.

Additionally, the control portion 11 can perform an optical character recognition (OCR) process on the image information in step S25 thereby to generate character string information and to also generate document information including the character string information.

Figure 6:
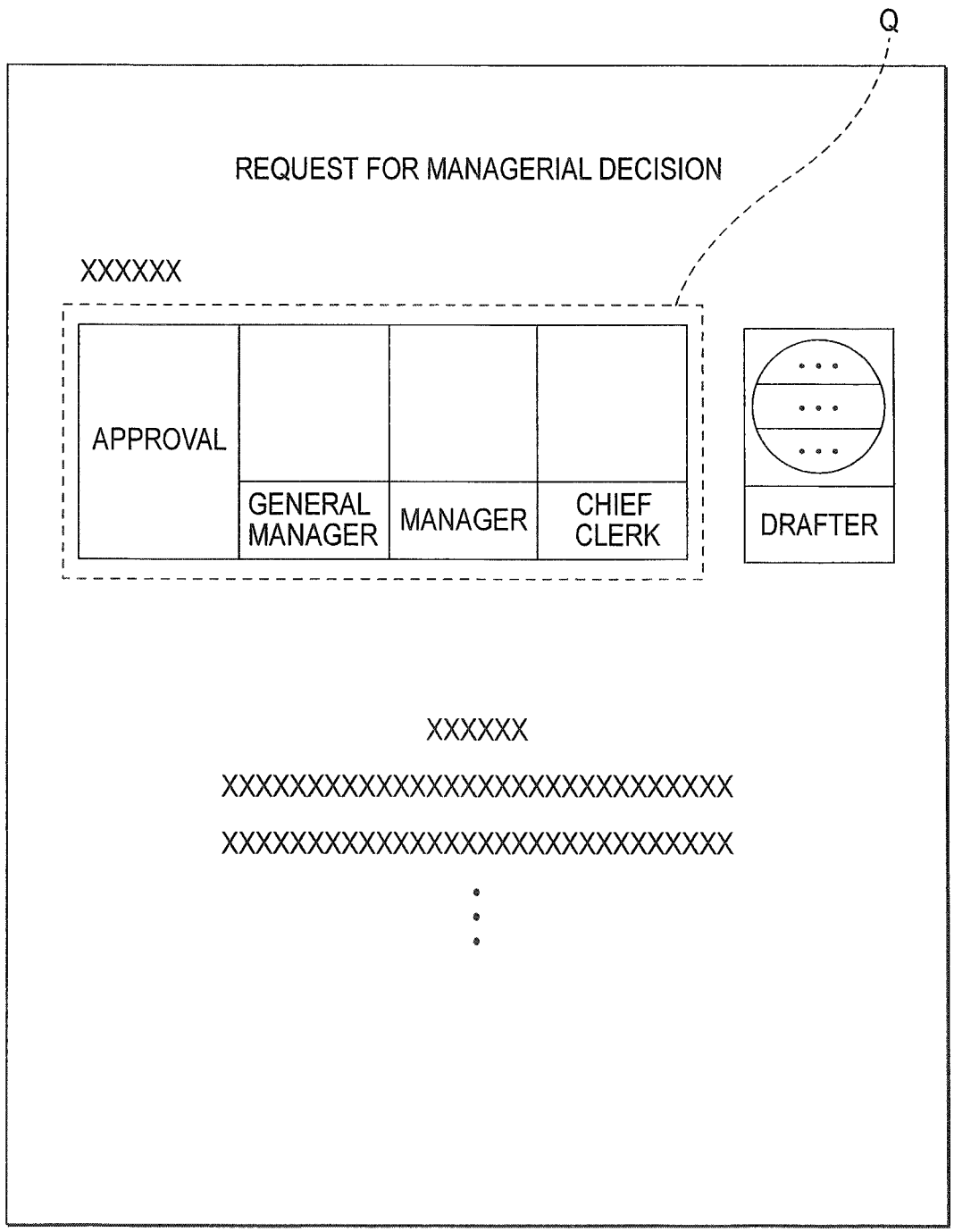
FIG. 6 is an explanatory view illustrating an outline of replacement part specifying information in the information processing apparatus according to the embodiment of the invention.

Also, the document information may preliminarily include information (i.e., replacement part specifying information) specifying part of the document information, which is to be replaced with the image information, as attribute information. The replacement part specifying information can be set as, for example, coordinate information representing coordinates on an image represented by the image information. That is, as illustrated in FIG. 6, it is advisable to employ a part (G), on which a seal is affixed, in a document as a replacement part and to set coordinate information (e.g., information representing a leftward top coordinate and a rightward bottom coordinate of a document region) defining this part as the replacement part specifying information. According to this example, in step S25, the control portion 11 extracts an image of a part specified by the replacement part specifying information from an image represented by the input image information. Also, the control portion 11 replaces a part of the document information, which corresponds to the extracted image, with the information representing the extracted image. Then, the control portion 11 stores the document information in the storage portion by overwriting the document information, a part of which has been replaced with the image information, on the original document information.

Additionally, pieces of the replacement part specifying information can be set to differ from one another corresponding to users, respectively. In this case, information specifying a user is associated with the replacement part specifying information and is stored as attribute information.

When an instruction to form an image is received, a user having issued the instruction is authenticated. Then, information specifying the authenticated user is held together with the information, which indicates that the image formation is performed, as attribute information. The authentication can be performed by a widespread method of, for example, causing a user to input a user name and a password.

Then, in step S25, the control portion 11 reads the information specifying the authenticated user, which is included in the attribute information, and acquires replacement part specifying information associated with the read information. Additionally, the control portion 11 extracts an image of a part specified by the replacement part specifying information from an image represented by the input image information. Also, the control portion 11 replaces a part of the document information, which corresponds to the extracted image, with the information representing the extracted image. Then, the control portion 11 stores the document information in the storage portion by overwriting the document information, a part of which has been replaced with the image information, on the original document information. According to this example, in a case where a seal field is determined corresponding to the post of each user, as illustrated in, for example, FIG. 8, it is useful to associate each user with the replacement part specifying information defining a seal field corresponding to the posts of users. Thus, even when a user taking the post of a chief clerk erroneously affix a seal on a field on which a user taking the post of a manager should affix a seal, the seal affixed by the user taking the post of a chief clerk is not reflected on the document information stored in the storage portion 12.

(Destroying of Read Medium)

According to the present embodiment, the image reading apparatus 3 can have a means adapted to destroy a read medium. Examples of such a means are an apparatus, such as a shredder that damages a read medium, an apparatus indicating that the read medium is invalid, and an apparatus adapted to hide or damage the code image part representing the document identifier formed on the medium by over-painting.

Alternatively, it is useful to treat the image formed on the read medium as invalid. That is, when updating at least a part of the document information, the control portion 11 newly issues a document identifier corresponding to the updated document information in step S25 shown in FIG. 5 to differ from the document identifier corresponding to the document information, which is stored before updated. The newly issued document identifier is held in the database as a document identifier corresponding to the updated document information. According to this example, even when the medium is read by the image reading apparatus 3 again, it is determined that the document information corresponding to the document identifier read from the medium is not stored in the storage portion 12. Thus, the updated document information can be prevented by being updated using the image that is formed on the medium before updated.

(Consideration of Elapsed Time)

According to the description having been described hereinabove, the information processing apparatus 1 does not cancel the restriction on an access to the document information according to the attribute information associated with the document information until reading the image information formed on the medium. However, a medium may be lost. In view of such circumstances, according to the present embodiment, when the control portion 11 receives the instruction to form an image and performs the image formation processing, the control portion 11 can acquire time-and-date information corresponding to the point in time from a time piece or a calendar portion (not shown) and can record the time-and-date information as attribute information. Also, the control portion 11 may treats the attribute information including the information, which indicates that the image formation is performed, as follows. For example, the control portion 11 periodically refers to information representing the time and date, at which the image formation is performed, and calculates the difference between a moment, at which the time-and-date information is referred to, and a moment at which the image formation is performed. In a case where the calculated difference exceeds a predetermined threshold value, the control portion 11 changes the information, which indicates that the image formation is performed, to the information, which indicates that the image formation is not performed, by, for instance, deleting the information, which indicates that the image formation is performed, from the attribute information. At that time, the threshold value may be predetermined corresponding to each piece of the document information at, for example, the registration of the document information. Consequently, at a point in time, at which a time period represented by the threshold value has been elapsed since the formation of an image, the restriction on an access to the document information is cancelled.

Incidentally, at that time, a document identifier corresponding to the document information can newly be issued to differ from the document identifiers having been issued.

(Modification of Restriction on Access)

According to the description having been described hereinabove, accesses to the document information associated with the attribute information, which indicates that the image formation is performed, for example, the printing, movement, browsing, and updating of the document information are restricted. However, the contents of the restrictions may be changed according to the kinds of accesses, for example, the browsing of the document information is not restricted, while only the printing, movement, and updating of the document information are restricted.

(Another Example of Method of Registering of Document Information)

The case of registration of the document information is not limited to the case where the document information is registered in response to a request from the client apparatus 2. For example, the information processing apparatus 1 may have a facsimile communication portion (not shown) or an e-mail receiving portion (not shown). Thus, document information to be registered is received through a facsimile or an e-mail by the information processing apparatus 1. Then, the information processing apparatus 1 issues a document identifier, and stores the document information in the storage portion 12.

(Operation)

Figure 9:
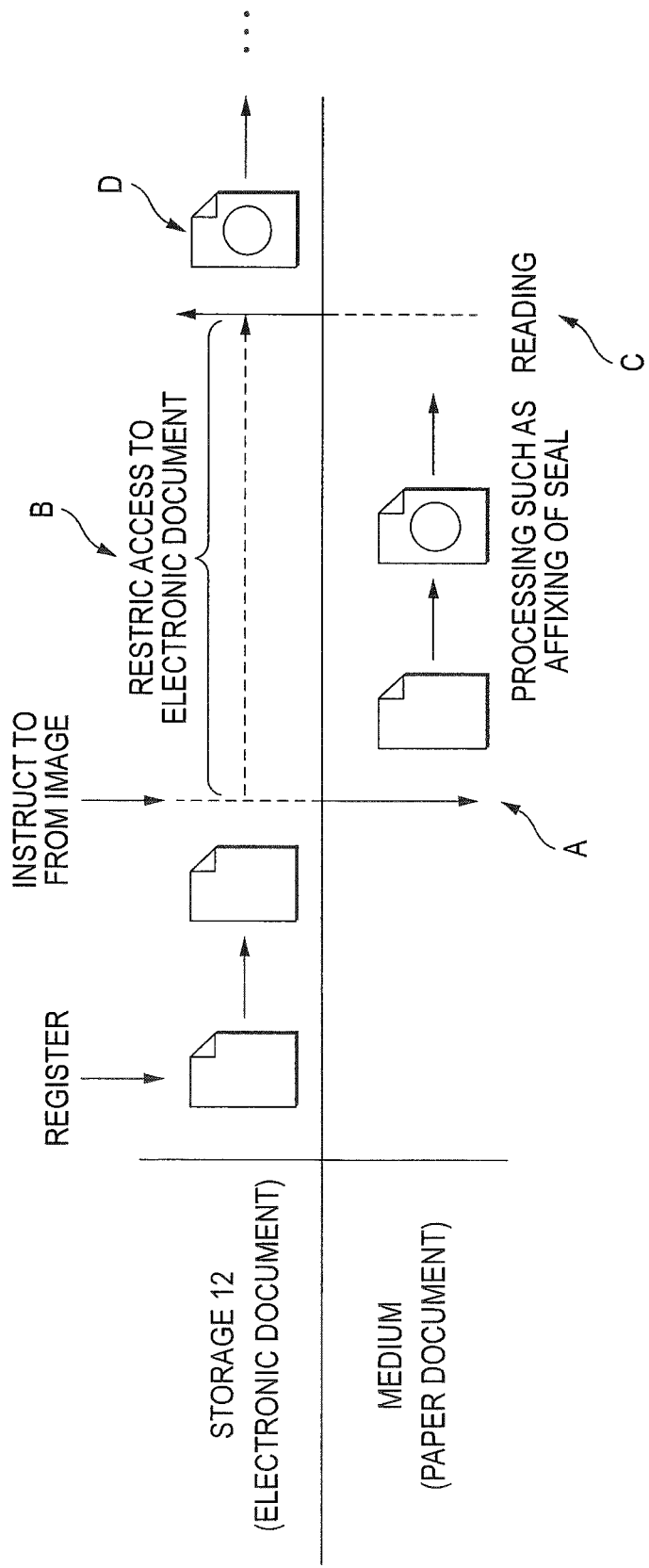
FIG. 9 is an explanatory view illustrating an example of an outline of an operation of the information processing apparatus according to the embodiment of the invention.

The information processing apparatus 1 according to the present embodiment is adapted so that as illustrated in FIG. 9, when the document information registered in the storage portion 12 as electronic document information is formed on a medium (A), an access to the document information registered as the electronic document information is restricted (B). Thus, virtually, only one of an electronic document and a document formed on a medium seems to be present. Consequently, the consistency of the document information between the electronic document and the document formed on the medium is not damaged by, for example, simultaneously processing, during the document formed on the medium is processed, the electronic document. Further, when the document formed on the medium is read after processed (C), the document information representing the electronic document is updated (D) according to the image information read at that time. The medium is damaged or cut by a wasting means. Consequently, the electronic document is prevented from being more than once updated according to the information recorded on the medium.

Figure 10:
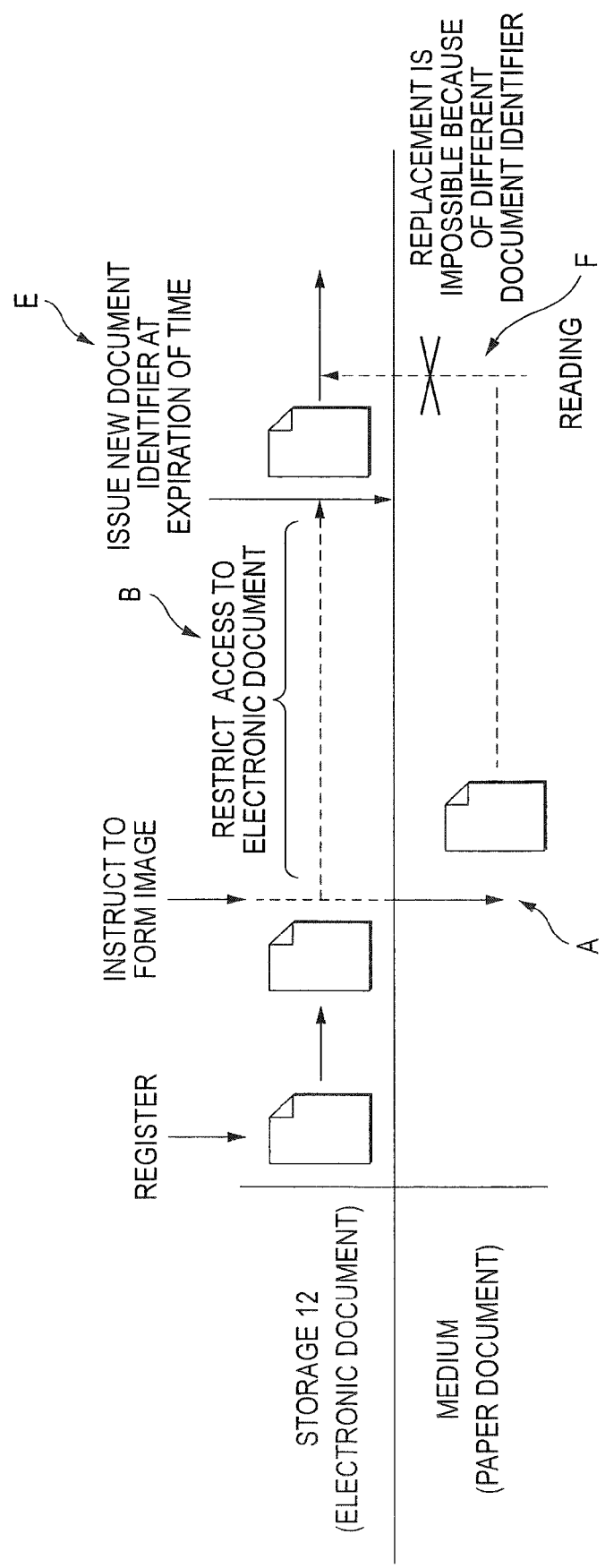
FIG. 10 is an explanatory view illustrating another example of an outline of an operation of the information processing apparatus according to the embodiment of the invention.

In a case where the processing is performed in consideration of the elapsed time since the image formation, as illustrated in FIG. 10, when the document information registered in the storage portion 12 as the electronic document information (A), the information processing apparatus 1 restricts an access to the document information registered as the electronic document information (B).

At that time, the information representing the time and date at a point in time, at which the image formation is performed, is recorded. Then, when a predetermined time period is elapsed since the time and data at which the image formation is performed, the restriction on an access to the document information stored in the storage portion 12 is canceled. The information processing apparatus 1 newly issues a document identifier corresponding to the document information stored in the storage portion 12 to differ from the document identifiers having been issued up to that time (E).

Subsequently, even when an image formed on the medium is read, there is no document information corresponding to the document identifier read from the medium. Thus, original document information representing the electronic document, the restriction of an access to which is canceled, is not replaced (F).

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
a storage that stores document information;
an image formation processor that receives an instruction to form an image corresponding to target document information selected from the document information stored in the storage, and that performs image formation processing with respect to the target document information;
a recording unit that records attribute information, which indicates that the image formation processing with respect to the target document information has been performed and that access to the target document information stored in the storage should be restricted so as to maintain consistency between the target document information stored in the storage and an image formed by the image formation processor, and associates the attribute information with the target document information; and
a controller that controls, in a case where a request for processing with respect to the target document information is received, to restrict the requested processing based on the attribute information;
a receiver that receives image information obtained from a medium on which an image is formed by the image formation processor with respect to the target document information; and
a replacement storage that specifies the target document information which corresponds to the received image information and that rewrites the attribute information so that the attribute information indicates that the image formation processing with respect to the target document information has not been performed and that access to the target document information stored in the storage is not restricted.

2. The information processing apparatus as claimed in claim 1, wherein
the requested processing with respect to the document information associated with the attribute information includes at least one of printing, moving, browsing, and updating of the document information.

3. The information processing apparatus as claimed in claim 1, wherein the replacement storage replaces a predetermined part of the specified target document information with a corresponding part of the received image information, and stores the replaced document information.

4. The information processing apparatus as claimed in claim 1, wherein
the image formation processor records user information representing a user who instructs to perform the image formation processing, associating the user information with the target document information, and
the replacement storage replaces a part of the document information specified by the image formation processor, the part being determined according to the user information, with a corresponding part of the received image information, and stores the replaced document information.

5. The information processing apparatus as claimed in claim 1,
wherein
the document information stored in the storage have identifiers, respectively,
in a case where the image formation processing is performed, an image corresponding to the target document information and an image representing an identifier of the target document information are formed, and
the replacement storage sets an identifier, which differs from the identifier assigned to the target document information before a part of the document information is replaced, as an identifier of the replaced document information.

6. The information processing apparatus as claimed in claim 1, further comprising:
a computing unit that computes an elapsed time since formation of an image with respect to the target document information is performed; and
a changing unit that changes the attribute information to information indicating that the image formation is not performed.

7. The information processing apparatus as claimed in claim 1, wherein the attribute information indicates a type of access that is to be restricted.

8. A non-transitory computer recording medium storing a program causing a computer to execute a process for processing information, the process comprising:
receiving an instruction to form an image corresponding to target document information;
performing image formation processing, by an image formation processor, with respect to the target document information;
recording attribute information, which indicates that the image formation processing with respect to the target document information has been performed and that access to the target document information stored in the storage should be restricted so as to maintain consistency between the target document information stored in the storage and an image formed by the image formation on processing, and associates the attribute information with the target document information; and controlling, in a case where a request for a processing with respect to the document information associated with the attribute information is received, to restrict the requested processing based on the attribute information;

receiving image information obtained from a medium on which an image is formed by the image formation processing with respect to the target document information;

specifying the target document information which corresponds to the received image information; and rewriting the attribute information so that the attribute information indicates that the image formation processing with respect to the target document information has not been performed and that access to the target document information stored in the storage is not restricted.

9. An information processing method comprising:

receiving an instruction to form an image corresponding to target document information;

performing image formation processing with respect to the target document information;

recording attribute information, which indicates that the image formation processing with respect to the target document information has been performed and that access to the target document information stored in the storage should be restricted so as to maintain consistency between the target document information stored in the storage and an image formed by the image formation processing, and associates the attribute information with the target document information; and controlling, in a case where a request for a processing with respect to the target document information is received, to restrict the requested processing based on the attribute information;

receiving image information obtained from a medium on which an image is formed by the image formation processing with respect to the target document information;

specifying the target document information which corresponds to the received image information; and rewriting the attribute information so that the attribute information indicates that the image formation processing with respect to the target document information has not been performed and that access to the target document information stored in the storage is not restricted.

10. The information processing method as claimed in claim 9, wherein the requested processing with respect to the document information associated with the attribute information includes at least one of printing, moving, browsing, and updating of the document information.

11. The information processing method as claimed in claim 9, further comprising:

generating replaced document information by replacing at least a part of the specified document information with the received image information; and storing the replaced document information, wherein the generating and storing of the replaced document comprise:

replacing a predetermined part of the specified document information with a corresponding part of the received image information; and storing the replaced document information.

12. The information processing method as claimed in claim 9, further comprising:

generating replaced document information by replacing at least a part of the specified document information with the received image information; and storing the replaced document information, wherein the performing of the image formation processing comprises recording user information representing a user who instructs to perform the image formation processing, and associating the user information with the target document information, and the generating and storing of the replaced document comprise replacing a part of the document information specified by the image formation processor, the part being determined according to the user information, with a corresponding part of the received image information, and storing the replaced document information.

13. The information processing method as claimed in claim 9, further comprising:

generating replaced document information by replacing at least a part of the specified document information with the received image information; and storing the replaced document information, wherein the document information stored in the storing of the document information have identifiers, respectively, in a case where the image formation processing is performed, an image corresponding to the target document information and an image representing an identifier of the target document information are formed, and the generating and storing of the replaced document comprise setting an identifier, which differs from the identifier assigned to the target document information before a part of the document information is replaced, as an identifier of the replaced document information.

14. The information processing method as claimed in claim 9, further comprising:

computing an elapsed time since formation of an image with respect to the target document information is performed; and changing the attribute information, which indicates that the image formation is performed and which is associated with the document information to be replaced, to second information not indicating that the image formation is performed.

* * * * *